Patented Apr. 19, 1949

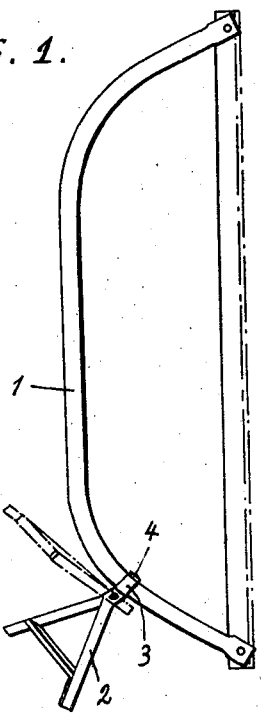
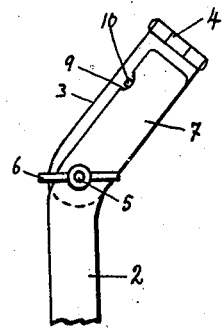
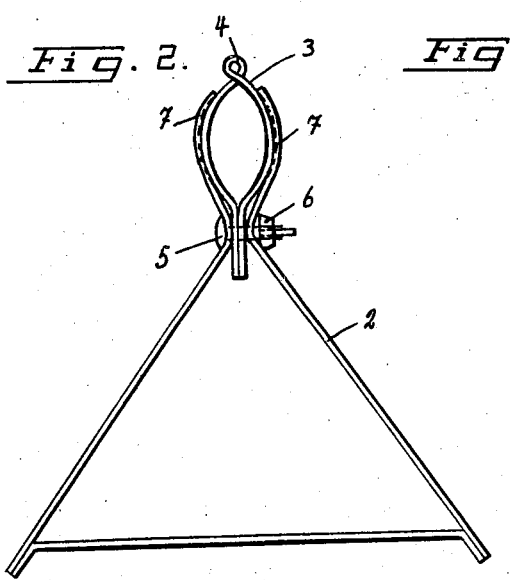
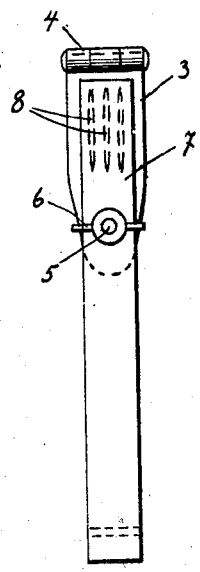

2,467,905

UNITED STATES PATENT OFFICE 2,467,905

SUPPORT FOR SAW FRAMES

Gustaf Ferdinand Hilding Östberg,

Gyllebo, Sweden

Application August 21, 1945, Serial No. 611,844
In Sweden November 15, 1943

1 Claim. (Cl. 248—360)

In the use of hand saws it is often unfit and uncomfortable when on interruptions in the work to place or lay the saw out of the way, since it is important that the saw blade will not get into contact with any objects, which may damage the saw teeth or which may be damaged by the saw. On working in a workshop, however, it is possible to hang up the saw on a wall or the like, but it is more comfortable to place the saw upon the floor. On working out of doors, such as on wood-sawing, it also will be advantageous to place the saw in an upright position upon the ground in such a manner that it cannot turn over and be damaged. This is possible by means of a supporting stand mounted on the saw, and the present invention relates to such a stand intended particularly for that kind of saws, which consist of a bowlike frame, between the ends of which the saw blade is fixed.

The supporting stand according to the invention is characterized by the fact that it consists of a foot support with at least two points of support, which foot support is turnably mounted on a clamp sleeve surrounding the saw frame and fixed to the same near its one end, and that the foot support by means of indulgent strapping members may be fixed in relation to the clamp sleeve in a position outwards from the frame, in order that the frame may be placed upright resting on the foot support and the adjacent end of the frame and preferably with the saw blade in an about vertical position and the foot support when necessary by overcoming the indulgent members may be swung in direction to the frame.

The invention is illustrated in the accompanying drawing, in which Figure 1 is a perspective view of a saw frame provided with a foot support according to the invention, and Figures 2 and 3 show the foot support in two side projections at a right angle to each other, whilst Figure 4 shows a modified embodiment of the invention.

In Figure 1 a supporting stand is mounted on a saw frame 1, which stand consists of a foot support 2, which is turnably mounted on a clamp sleeve 3. The clamp sleeve surrounds the saw frame and is strapped on the same near the one end. The clamp sleeve consists of two bow-shaped parts, which are connected by means of a suitable hinge 4 at the one end. Through openings at the other end a bolt 5 with a wing nut 6 is passed. At this end the both parts of the clamp sleeve are plane and lie tightly against each other. On the bolt 5 a hoopiron forming the foot support 2 is mounted, which is formed like a triangle, at which the ends of the hoop-iron meeting in the one corner are turnably mounted on the bolt 5 on each side of the clamp sleeve 3, as shown in Fig. 2. The foot support is extended behind the bearing point and forms two springing blade 7, which embrace the clamp sleeve 3 and serve for holding the foot support in a position projecting from the saw frame at a right angle, as is shown with full lines in Figure 1. The surfaces of the clamp sleeve 3 and said springing blades 7, which are turned to each other, are provided with ridges and grooves 8 engaging each other, in order to keep the foot support in the said position. The both external corners of the trianglelike foot support form two supporting points of the stand, whilst the third supporting point is formed by the adjacent end of the saw frame 1. The foot support is fixed to the saw frame at such a point, that the saw blade has about a vertical position, when the saw rests on the support. When the saw is used the foot support usually may have its outwards directed position on the same, but when the saw is operated by a person at each end the foot support may be turned in direction to the saw to the position shown in Figure 1 with interpunched lines, so that it will be out of the way for the respective person. This turning of the foot support is carried out by a single manipulation with overcoming the resistance of the springing blades 7.

The invention is not limited to the described embodiment of the support, since this of course may be modified as to the form of the parts without departing from the scope of the invention.

In Figure 4 an embodiment of the support is shown, at which the springing blades 7 have an angle to the foot support 2, so that the support will have an about vertical position, when the saw rests on the support, whilst the saw itself will have an inclined position. In the cases, when the saw resting against a wall or the like in reversed position hitherto has been used for cutting smaller boards, wood or the like, it is possible in the present invention to keep the saw in this position by placing a foot on the stirrup of the support. The resting of the saw against a wall or the like is then eliminated.

As further shown in Figure 4 the blades 7 at the edge preferably are provided with a recess 9 for a corresponding pin 10 or the like on the outside of the clamp sleeve 3, which arrangement has for its purpose to serve as a stop for the support in its correct position.

I claim:

A support for saw frames, consisting in a foot support with at least two supporting points and being turnably mounted on a clamp sleeve surrounding the saw frame near its one end, and indulgent strapping members for holding the foot support in relation to the clamp sleeve in a position directed outwards from the frame, in order that the frame may be placed upright resting on the foot support and the adjacent end of the frame, preferably with the saw blade in about vertical position, and the foot support when necessary may be turned in direction to the frame with overcoming the resistance of the indulgent strapping members.

GUSTAF FERDINAND HILDING ÖSTBERG.

REFERENCES CITED

The following references are of record in the file of this patent:

UNITED STATES PATENTS

| Number | Name | Date |
|---|---|---|
| 1,282,488 | Streever | Oct. 22, 1918 |
| 1,363,664 | Livingston | Dec. 28, 1920 |
| 1,920,581 | Murphy et al. | Aug. 1, 1933 |
| 2,086,102 | Stradling | July 6, 1937 |
| 2,247,131 | Muldoon | June 24, 1941 |